Patented Sept. 15, 1942

2,296,214

UNITED STATES PATENT OFFICE 2,296,214

NEW DERIVATIVE OF 2.5-DIAMINO-1.4-BENZOQUINONE

Gerhard Langbein, Hofheim in Taunus, Germany, assignor to General Aniline & Film Corporation, a corporation of Delaware No Drawing. Original application November 29, 1938, Serial No. 242,919. Divided and this application August 16, 1941, Serial No. 407,236. In Germany December 4, 1937

1 Claim. (Cl. 260—315)

The present invention relates to a new derivative of 2.5-diamino-1.4-benzoquinone, more particularly it relates to the compound obtainable by condensing 2-n-butoxy-5-(N-ethyl-carbazolyl - 3' - amino)-3.6-dichloro-1.4-benzoquinone with 5-amino-3-sulfo-2-hydroxy-benzoic acid, for instance in the form of its sodium salt.

The condensation is preferably performed by heating the components in a diluent, such as an organic solvent and, if desired, in the presence of an acid binding agent.

This application is a division of application Serial No. 242,919, filed November 29, 1938, Patent 2,267,741.

The following example serves to illustrate the invention, but it is not intended to limit it thereto; the parts are by weight:

A mixture of 45.7 parts of 2-n-butoxy-5-(N-ethyl - carbazolyl - 3'-amino)-3.6-dichloro-1.4-benzoquinone, 1000 parts of alcohol, a solution of 27 parts of 5-amino-3-sulfo-2-hydroxybenzoic acid neutralized by means of sodium carbonate and 10 parts of sodium acetate is heated to boiling, while stirring for one hour. The solid brown condensation product is filtered with suction, while hot, and washed with alcohol. It dissolves in water to a brown solution and dyes chromed cotton current tints. It has the following probable constitution:

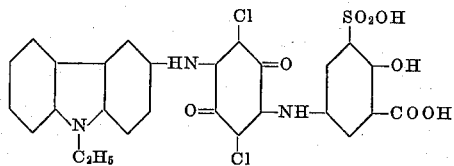

I claim:
The compound of the formula:

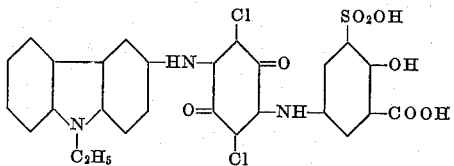

being a brown product which dyes chromed cotton current tints.

GERHARD LANGBEIN.